United States Patent
Bourbonnais et al.

(10) Patent No.: US 8,473,953 B2
(45) Date of Patent: Jun. 25, 2013

(54) BATCHING TRANSACTIONS TO APPLY TO A DATABASE

(75) Inventors: Serge Bourbonnais, Palo Alto, CA (US); Somil Kulkarni, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 12/939,119

(22) Filed: Nov. 3, 2010

(65) Prior Publication Data
US 2012/0023369 A1    Jan. 26, 2012

Related U.S. Application Data

(60) Provisional application No. 61/366,499, filed on Jul. 21, 2010.

(51) Int. Cl.
*G06F 9/46*   (2006.01)

(52) U.S. Cl.
USPC ............ 718/101; 709/202; 715/764; 707/703

(58) Field of Classification Search
None
See application file for complete search history.

(56) References Cited

U.S. PATENT DOCUMENTS

| | | | |
|---|---|---|---|
| 7,240,054 B2 | 7/2007 | Adiba et al. | |
| 7,490,083 B2 | 2/2009 | Bourbonnais et al. | |
| 7,596,523 B2* | 9/2009 | Sobel et al. | 705/36 R |
| 7,716,181 B2* | 5/2010 | Todd | 707/635 |
| 2002/0023122 A1* | 2/2002 | Polizzi et al. | 709/202 |
| 2005/0080825 A1* | 4/2005 | Fleck et al. | 707/201 |
| 2005/0114285 A1* | 5/2005 | Cincotta | 707/1 |
| 2005/0165858 A1* | 7/2005 | Tom et al. | 707/201 |
| 2005/0193041 A1 | 9/2005 | Bourbonnais et al. | |
| 2005/0289198 A1* | 12/2005 | Todd | 707/204 |
| 2007/0143375 A1* | 6/2007 | Tom et al. | 707/204 |
| 2007/0214457 A1* | 9/2007 | Goyal et al. | 718/101 |
| 2007/0260696 A1* | 11/2007 | Bohannon et al. | 709/208 |
| 2008/0098044 A1* | 4/2008 | Todd | 707/202 |
| 2008/0163222 A1 | 7/2008 | Bourbonnais et al. | |
| 2009/0064147 A1 | 3/2009 | Beckerle et al. | |
| 2009/0217274 A1 | 8/2009 | Corbin et al. | |
| 2010/0082540 A1* | 4/2010 | Isaacson et al. | 707/624 |
| 2010/0114848 A1 | 5/2010 | McKelvie et al. | |
| 2010/0145910 A1 | 6/2010 | Zhao et al. | |
| 2010/0287553 A1* | 11/2010 | Schmidt et al. | 718/101 |
| 2011/0246553 A1* | 10/2011 | Somani et al. | 709/202 |
| 2011/0258630 A1* | 10/2011 | Fee et al. | 718/101 |

OTHER PUBLICATIONS

IBM Corp., "Autonomic Batch Processing", Technical Disclosure, IP.Com No. IPCOM000133516D, Jan. 27, 2006, 5 pp.
Oracle Corp., "Oracle Database Advanced Replication, 10g Release 1 (10.1)", Dec. 2003, 342 pp.

* cited by examiner

*Primary Examiner* — Apu Mofiz
*Assistant Examiner* — Hung Le
(74) *Attorney, Agent, or Firm* — David W. Victor; Konrad, Raynes, Davda & Victor LLP

(57) ABSTRACT

Provided are a method, system and program for batching transactions to apply to a database. A transaction manager receives a plurality of transactions to apply to a database and adds the transactions to a work queue. One of a plurality of agents processes a batch of transactions from the work queue. Each agent executes a batch of transactions from the work queue against the database independent of the operations of other of the agents executing batches of transactions. The agent applies the transactions in the batch against the database and commits the transactions in the batch to the database in response to completing all of the transactions.

27 Claims, 8 Drawing Sheets

BATCHING TRANSACTIONS TO APPLY TO A DATABASE

RELATED APPLICATIONS

This application claims the benefit of U.S. Provisional Application No. 61/366,499, filed on Jul. 21, 2010, which Provisional Application is incorporated herein by reference in its entirety.

BACKGROUND OF THE INVENTION

1. Field of the Invention

The present invention relates to a method, system, and computer program product for batching transactions to apply to a database.

2. Description of the Related Art

In a relational database management system (RDBMS), data is stored in one or more tables having multiple rows (records), where each row has one or more columns (fields). A subset of the columns are designated as key columns and the combination of values of the key columns of the rows of a single table must be distinct.

Database replication is a distributed technology used to asynchronously maintain one or more copies of the same data. The origin of the data is known as the "source", and the receiver of the copy is the "target". In an RDBMS, data is stored in multiple tables that are logically related based on business rules. Replication of a database is performed to maintain copies (replicas) of source tables residing in a source database in corresponding target tables in one or more target databases. As part of replication, changes (inserts, deletes, and updates) to rows of the source tables in the source database that is subject to replication are copied to the target table in a target database at one or more replication sites.

The propagation of changes made to a target database may be synchronous or asynchronous to the original change. Synchronous propagation copies changes to the source tables to target tables as part of a single transaction (unit of work). If the application of any transaction fails, then the entire transaction rolls back. Asynchronous propagation stores changes to the target tables in a queue and propagates and applies those changes to the target database. Synchronous change propagation requires that the database management systems maintaining all (or most) copies be active and available at the time of the change. Also, synchronous change propagation introduces substantial messaging and synchronization costs at the time of the original changes.

The means of detecting changes to be propagated asynchronously can be active or passive. Active change detection isolates the changes, at the time of the change, for later processing using database triggers or a similar mechanism. Passive change detection exploits information from the database recovery log, where changes are recorded for other purposes, to deduce what rows, of which tables, were changed as well as both the old and new values of changed columns.

Replication also maintains the integrity of database transactions. A database transaction is a unit of work, with one or more insert, update or delete row operations to one or more tables, and is independent of other transactions. Transactional integrity is enforced when the transaction's unit of work is either applied in its entirety or has no effect whatsoever when not applied.

Database transactions are considered dependent on each other, if they modify the same row(s) or if they modify rows that are related via RDBMS-enforced rules, such as referential integrity or uniqueness constraints. For example, a transaction might be updating the record for an employee that was inserted by another transaction. The replication detects such dependencies by inspecting the values of the data before applying the data.

In a replication process, database integrity is preserved when dependent transactions are committed in the order in which they were committed at the source, or source-commit-order. Non-dependent transactions can be committed in any order at the target, without impacting database integrity. For example, two transactions modifying unrelated customer accounts in a purchasing system can be replicated at different speed without impacting overall database integrity. The impact is that a query for fetching updated customer information cannot be routed to the target database until replication has replicated all dependent transactions for this customer's information to the target. The ability to re-execute transactions out-of-order is needed for scalability of the replication apply process, very large numbers of independent agents can be used and often allow to execute workloads at the target faster than they were executed at the source.

In a typical database environment, there are varying levels of parallel transactional processing, involving concurrent transactions that execute read and write actions against database information. Fundamental to the nature of a data replication process is the choice of how to move, order and apply that stream of parallel database event changes to a target database. One conventional approach provides a certain degree of apply parallelism by grouping related tables into distinct sets and having each set of tables applied by a completely separate program. In another conventional approach, parallelism is provided but without preserving the source data event order. Thus, to provide data integrity, a "shadow" table is used to track and maintain each individual data row change. This approach, however, has a significant overhead cost in both making updates and in performing lookups against the shadow table.

SUMMARY

Provided are a method, system and program for batching transactions to apply to a database. A transaction manager receives a plurality of transactions to apply to a database and adds the transactions to a work queue. One of a plurality of agents processes a batch of transactions from the work queue. Each agent executes a batch of transactions from the work queue against the database independent of the operations of other of the agents executing batches of transactions. The agent applies the transactions in the batch against the database and commits the transactions in the batch to the database in response to completing all of the transactions.

DETAILED DESCRIPTION

Figure 1:
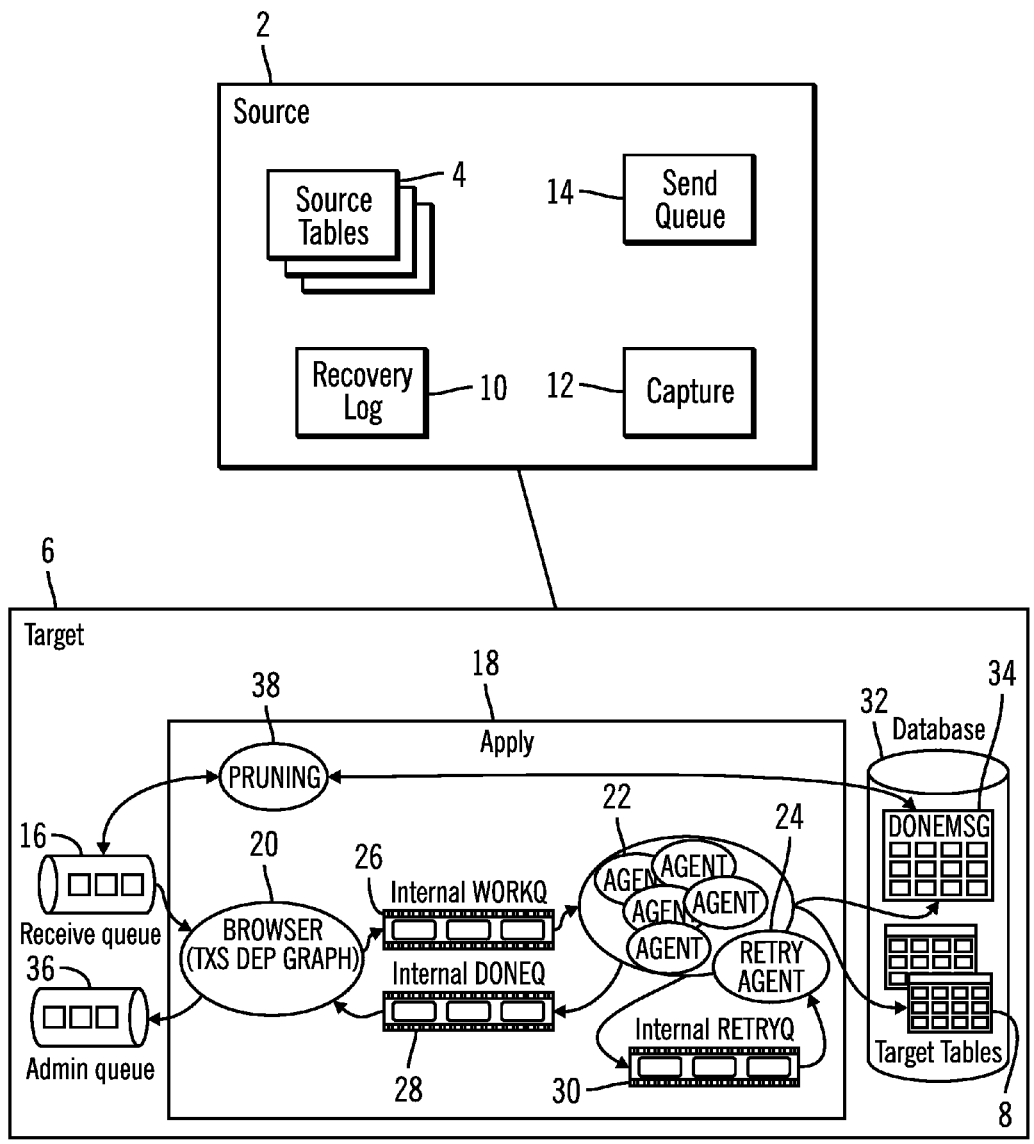
FIG. 1 illustrates an embodiment of a computing environment.

FIG. 1 illustrates an embodiment of a computing environment. A source node 2 communicates changes to source tables 4 to a target node 6 to replicate to target tables 8 in a target database at a replication site. The target node 6 may apply updates to the target tables 8 in parallel for asynchronous data replication. The source node 2 has one or more source tables 4, a recovery log 10, a capture program 12, and a send queue 14. The target node 6 has one or more receive queues 16, an apply program 18 and one or more target table copies 8. The receive queue 16 receives changes captured by the capture program 12 in a source-commit-order. The source-commit-order is the order in which updates at the source node 2 are committed to the source tables 4. The apply process 18 includes a browser 20, also known as a transaction manager or processor, that reads the transactions from the receive queue 16 and queues them for processing by agents 22 to apply to the tables 8 in the target database 32. The apply process 18 includes a pool of apply agents 22 that apply transactions independently to the target database 8 and a retry agent 24.

The source tables 4 and target database 32 may be implemented in separate source and target storage systems, comprising a single storage device, or an array of storage devices, such as hard disk drives, solid state storage devices (SSDs), an array of volatile memory devices, tape drives, optical drives, etc.

The apply process 18 further includes three internal queues, an internal WORKQ (work queue) 26 where transactions are queued to be processed by the first available agent 22 from the pool; a DONEQ (done queue) 28 where completed transactions are placed by the agents 24 after they have been processed by an agent 24; and a RETRYQ 30 (retry queue), where transactions that fail against a target database 32 including the target tables 8 due to a contention error (such as a lock timeout) are placed to be re-tried by the retry agent 24. A DONEMSG (done message) table 34 is used to record each applied transaction. The WORKQ 26 and the DONEQ 28 are used to allow the browser 20 to communicate with the agent threads 22. A pruning thread 38 uses the DONEMSG table 34 to asynchronously delete messages indicated in the DONEQ queue 28 from the receive queue 16. In certain embodiments, a two-phase commit is not required between the queuing system and the target database. An Admin (administrator) queue 36 is used by the apply program 18 to send control messages to the capture program 12 at the source node 2.

In certain embodiments, the source 2 and target 6 nodes may be implemented in separate computing devices that communicate over a network or another type of interface, such as a bus interface. Alternatively, the source 2 and target nodes 6 may comprise software programs that execute in a single system or in a distributed computing system.

In certain embodiments, there may be multiple replication sites, each replication site comprising a separate target node 6 having an apply process 18. In such case, the capture 12 program would replicate changes to the source tables 4 to each target node 6 at each of the replication sites.

The entries of the recovery log 10 describe changes to rows of the source tables 4 at the source node 2, such as, by way of example, information defining the table being changed, the value of the key column in the row being changed, the old and new values of all columns of the changed row, and the transaction (unit of work) containing the change. Recovery log 10 entries for inserted rows contain only new column values while recovery log entries for deleted rows contain only old column values. Recovery log 10 entries for updated rows contain the new and old values of all row columns. The order of entries in the recovery log 10 reflect the order of change operations within each transaction and the order of transaction commit records reflects the order in which transactions are completed.

The type of row operations in the recovery log 10 that are communicated to the receive queue 16, to apply to the target database 32, may comprise delete, insert, update, or key update. Updates that do not modify the replication key (update) are distinguished from updates that do modify the replication key (key update).

Figure 2:
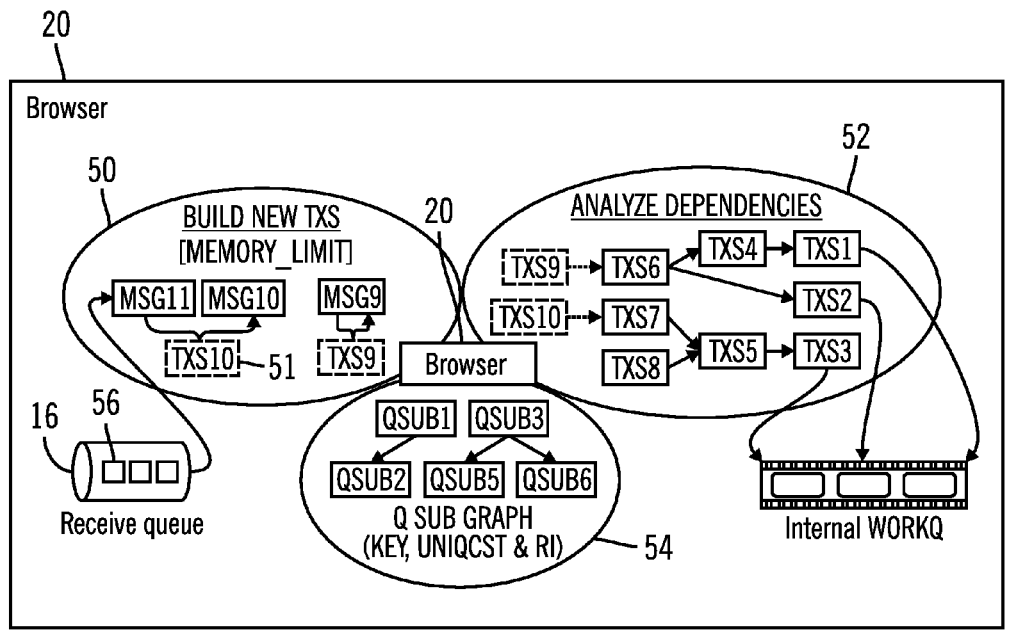
FIGS. 2, 3, and 4 illustrate embodiments of the operation of agents to apply changes to a target database.

FIG. 2 shows components 50, 52, and 54 of the browser 20 for reading incoming ordered transaction messages 56 from the receive queue 16. Data in one or more messages 50 in the receive queue 16 is used to build a new transaction 52 in a memory used by the browser 20. The component 52 of the browser 20 analyzes the transactions in the receive queue 16 for dependencies by comparing transaction data values with data in transactions that arrived ahead of the transaction being considered in the receive queue 16, and by using database level definitions of primary keys, unique constraints and referential integrity constraints. If dependency is detected, then the browser 20 adds the transaction to a transaction dependency graph 54, such that the dependent transaction is not dispatched until the transaction(s) on which it depends have been completed. If a transaction is not dependent, then the transaction may be immediately queued on the WORKQ 26 to be executed in parallel by the next available agent 22 in the pool. In this way, the browser 20 places transactions on the WORKQ 26 to maintain data dependencies.

Figure 3:
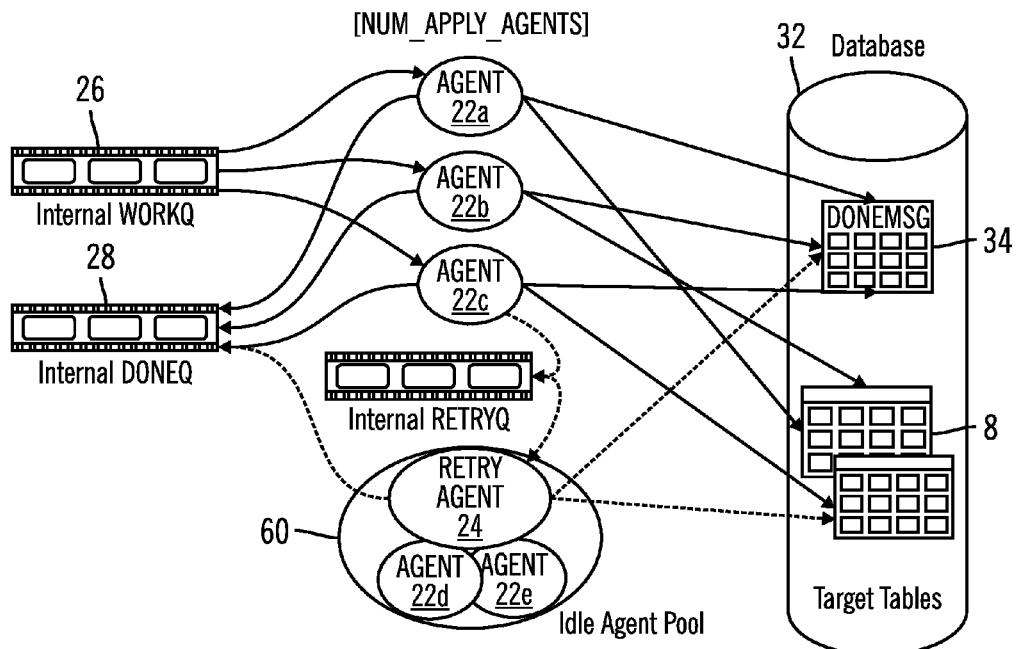

FIG. 3 shows a pool of apply agents 22a, 22b, 22c, which number is determined by a preset number of apply agents (NUM_APPLY_AGENTS), where each agent 22a, 22b, 22c gets any transaction from the WORKQ 26 and applies it to the target tables 8 of the database 32, unaware of the work performed by other agents. Transactions can by applied out-of-order with respect to the source commit order, however, data integrity may be preserved. One or more entries are recorded in the DONEMSG 34 table to allow the pruning 36 thread to delete the corresponding transaction messages in the receive queue 16. Further, certain agents 22d, 22e and the retry agent 24 are indicated as idle in the agent idle pool 60. On successful execution of a transaction, the agent 22a, 22b, 22c uses the DONEQ 28 to return the transaction to the browser 20. In this method, each agent 22a, 22b, 22c applies only one transaction at a time.

Figure 4:
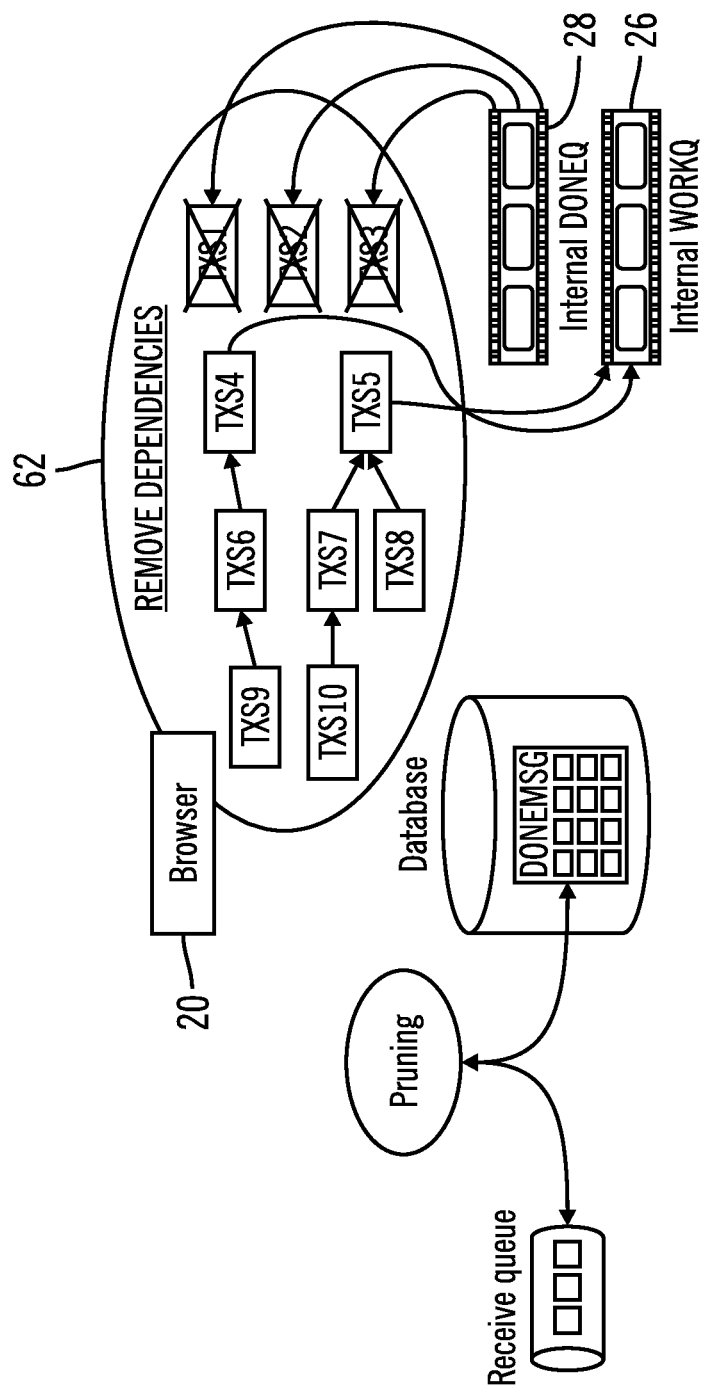

FIG. 4 shows the browser 20 having a remove dependencies 62 component using completed transactions TXS1, TXS2, TXS3 from the DONEQ 28 to remove dependencies from transactions TXS4, TXS5 that are dependent on these completed transactions TXS1, TXS2, TXS3. Transactions with no dependencies are queued on the WORKQ 26. The pruning thread 38 asynchronously removes completed transaction messages indicated in the DONEMSG table 34 from the incoming receive queue 16 and removes their corresponding entries from the DONEMSG table 34.

The target database 32 maintains both database and transactional integrity. All changes are captured at the source node 2 by the capture process 12 that propagates only committed transactions (rolled-back transactions are not propagated) onto one or several queues 14. Changes are staged in the queue(s) 14, waiting to be processed by the apply process 18 in the target nodes 6. A consistency group is a set of tables that can be possibly updated by the same transaction. Tables that belong to the same consistency group must be replicated on the same queue, such that all tables that need to be kept consistent in relation to each other are replicated on the same queue. All incoming transactions are applied in parallel at the target by the apply process 18 that applies dependent transactions in-order and non-dependent transactions in any order. The apply process 18 can receive changes from multiple queues, but handles each incoming queue independently of all others. Database consistency is maintained per receive queue 16 at the consistency group level.

The agents 22 perform a transaction commit operation to commit their applied transaction to the target tables 8. The database transaction commit operation is costly. A characteristic of a database 32 is that log records for a transaction must be persisted before control is returned to the application. Therefore, committing to the database 32 requires I/O to the log and becomes a performance bottleneck in a high-volume transaction system. Each apply agent 22 must wait for the commit to complete, before it can process the next transaction from the WORKQ 26. In the described embodiments, the system reduces the number of commit operations by having agents 22 batch transactions from the WORKQ 26, by selecting multiple transactions from the head of the WORKQ 26. Batching transactions results in dramatic performance improvements.

Any error encountered while applying a change in a transaction affects the processing of the entire batch. To process errors in a batch while preserving overall transactional and database integrity, the agents 22 batch transactions in the WORKQ 26. The browser 20 places transactions on the WORKQ to preserve data integrity and dependency. For dependency detection optimization, the browser 20 may rely on the database 32 to detect certain classes of dependencies, assuming proper database constraints are in place. The database 32 can detect dependency errors, contention errors and non-recoverable errors and return those errors to the agents 22 that applied the transaction resulting the error. The browser 20 assumes that some errors are unlikely to occur and leaves their detection to the database 32, instead of incurring a costly dependency analysis.

Database 32 detected dependency errors are errors that can be caused by playing transactions out-of-order. If and when the error is reported by the database 32, the agent 22 retries the failed transaction playing it in the source commit order. The agent retries the failed transaction until every transaction that is older, in terms of the source-commit-order, has been processed.

Uniqueness constraint violations and referential integrity constraint violations cause the agent 22 to rollback the entire transaction and retry the transaction it until successful or until the failed transaction becomes the oldest transaction in the transaction dependency graph, at which point the agent 22 can determine that the error was not caused by playing the transaction out-of-order, but by some external factor, such as a user application having deleted the record.

Contention errors result from agents 22 competing for locks. The transaction will succeed if retried after the lock has been released by the agent 22 or external application holding the lock. The likelihood of contention errors increases with the amount of parallelism. For example, several transactions might be competing to lock and update a common database 32 data page. Serially executing transactions that failed because of contention errors solves this problem. Contention errors cause the agent 22 to rollback the entire transaction and queue it on the RETRYQ 30 for serial execution by the retry agent 24 (see FIG. 3). The retry agent 24 is a regular agent that is part of the pool, but that has the added responsibility of serially applying transactions on the RETRYQ 30 in order to eliminate any possibility of contention among the apply agents 22. The retry agent 24 may use the DONEQ 28 to return completed transactions to the browser 20.

Non-recoverable errors are errors that generally require an external intervention to be resolved and may not be retried by the apply process 18. For example, a target object is missing. Non-recoverable errors are handled by following a user-specified action, such as stopping the entire apply process 18, and all agents 22 executing within the apply process 18.

Dependency and contention errors are considered transient errors and are retried. Non-recoverable errors are considered permanent errors and may not be retried by the apply process 18.

Dependent transactions detected by the browser 20 are held back from the WORKQ 26 until all dependent transactions have been processed. When agents 22 execute transactions in batch mode, commits are less frequent and dependent transactions are therefore held back for a longer time. However, the browser 20 may leave some dependencies to be detected by the database 32 for better performance. For example, a row for an employee in a payroll database might not be allowed to be inserted unless a row for the department where this employee works already exists. In this case, the transaction inserting the employee is dependent on a prior transaction having inserted the department. Such transaction could have happened weeks prior, or a few milliseconds prior. There is a large class of dependencies that occur rarely in practice and are better left to be detected by the database 32. For example, it is more efficient to let the insert employee transaction be executed asynchronously, possibly before the insert department transaction and let the database detect the constraint violation, than to have the apply process 18 detect the dependency by comparing data values, because in the majority of the cases, the department will already exist in the target database. The apply program 18 retries inserting the employee in case of constraint error.

Figure 5:
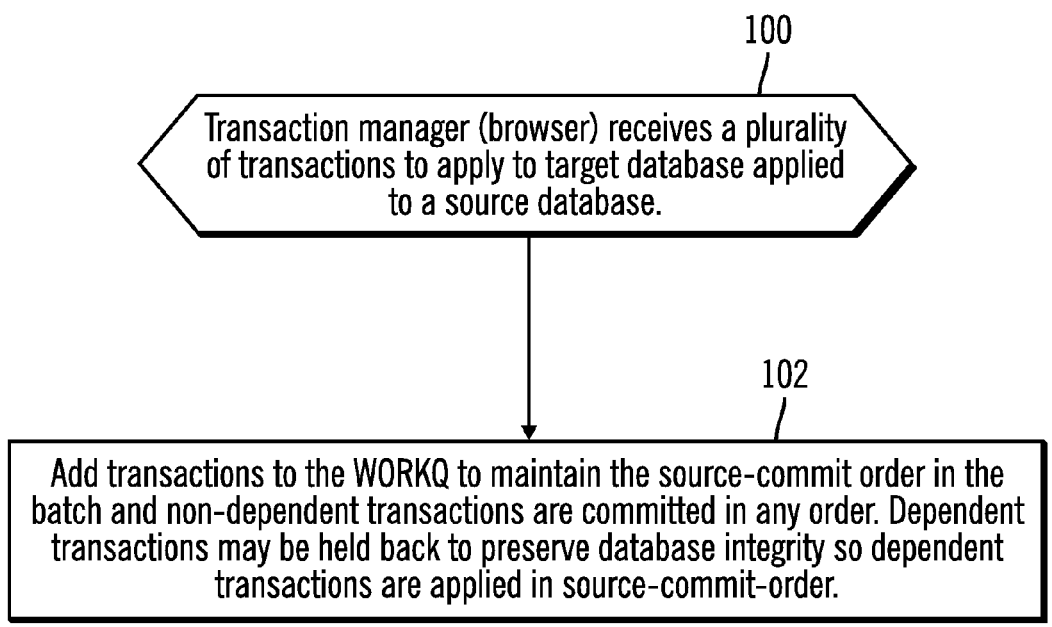
FIG. 5 illustrates an embodiment of operations to batch transactions for an agent to apply to a database.

FIG. 5 illustrates an embodiment of operations performed by the browser 20 to add transactions in the receive queue 16 to the WORKQ 26. Upon the browser 20 receiving (at block 100) transactions at the receive queue 100 to source tables 4 in the source database, the browser 20 adds (at block 102) transactions to the WORKQ to maintain the source-commit order of dependent transactions and non-dependent transactions are committed in any order. Dependent transactions may be held back in the dependency graph to preserve database integrity and apply the dependent transactions in source-commit-order. The browser 20 releases dependent transactions held back in the dependency graph in response to the agents 22 completing the transactions on which the dependent transaction depends. Further, the browser 20 may maintain transaction consistency in the WORKQ 26 by not breaking up individual rows of a transaction and either scheduling the transaction as a whole or no part of it. As discussed, the browser 20 may not try to detect all dependencies, and leave certain dependencies to be determined by the database 32. The browser 20 can receive transactions from multiple receive queues, but handle each incoming receive queue independently of others, such that database consistency is at the receive queue 16 level.

Figure 6:
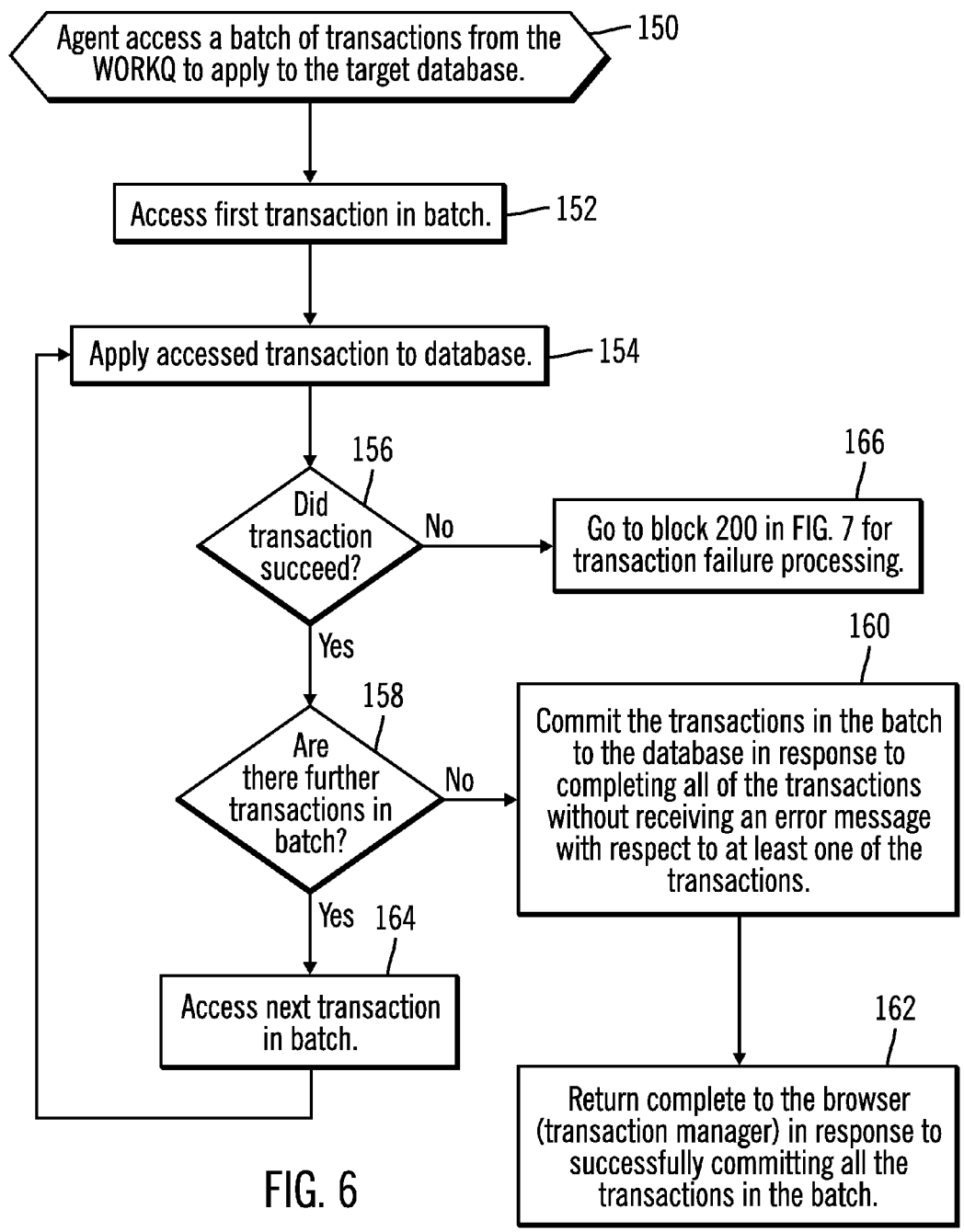
FIG. 6 illustrates an embodiment of operations for an agent to apply batched transactions.

FIG. 6 illustrates an embodiment of operations performed by an agent 22 to process a batch of transactions and execute independently of other agents. The agent 22 accesses (at block 150) a batch of transactions from the WORKQ 26 to apply to the target tables 8 in the target database 32. The agent 22 may pull the batch of transactions from the head of the WORKQ 26. The agent 22 accesses (at block 152) a first transaction in the batch, according to the transaction ordering, and applies (at block 154) the accessed transaction to the target database 32. If (at block 156) the transaction succeeded and (if at block 158) there are no further actions in the batch to process, then the agent 22 commits (at block 160) the transactions in the batch to the database 32 in response to completing all of the transactions without receiving an error message with respect to at least one of the transactions. In this way, one commit is performed after applying successfully all transactions. The agent 22 returns (at block 162) complete to the browser 20 in response to successfully committing all the transactions in the batch. The returned "complete" indicates that all transactions in the batch were successfully committed. If (at block 158) there are not further unprocessed transactions in the batch, then the agent 22 accesses (at block 164) a next transaction in the batch and returns to block 154 to process that next transaction. If a transaction failed (from the no branch of block 156), then control proceeds (at block 166) to block 200 in FIG. 7 for transaction failure processing.

In further embodiments, the agent 22 may commit all successful transactions in a batch when there are not enough transactions to make a complete batch by checking the WORKQ 26 to complete the batch and allow the browser 20 to schedule any waiting/dependent transactions as soon as possible. In a further embodiment, the agents 22 may use a predefined heuristic to determine if there are enough transactions available on the WORKQ 26 to complete a batch. In one embodiment, the agent 22 may check whether the number of available transactions on the WORKQ 26 is less than the number of predefined agents to determine if there are a sufficient number of transactions for a batch.

When the agent 22 commits a transaction, the agent 22 places the transaction on the DONEQ 28. The browser 20 processes the DONEQ 28 to determine if completed transactions have pending dependent transactions held in the dependency graph. If so, the browser 20 would release dependent transactions to the WORKQ 26 that depended from transactions that cleared the DONEQ 28. The agent 22 adds an entry to the DONEMSG table 34 after successfully applying the transaction and before committing. The pruning thread 38 removes transactions in the receive queue 16 identified in the DONEMSG table 34.

Figure 7:
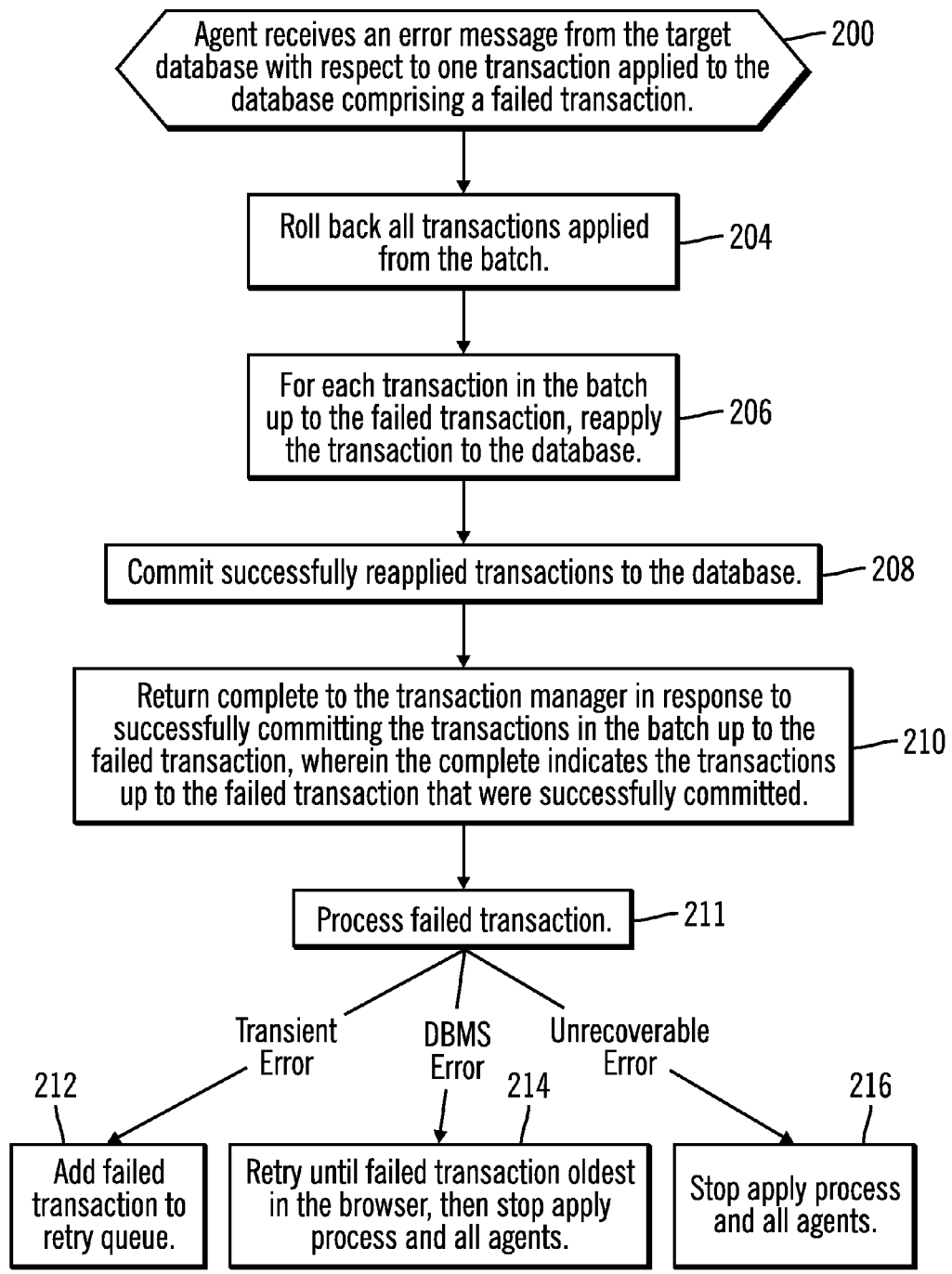
FIG. 7 illustrates an embodiment of operations for an agent to handle a failed transaction.

FIG. 7 illustrates an embodiment of operations performed by an agent 22 to handle an error message indicating a transaction failure at block 166 in FIG. 6. Upon the agent 22 receiving (at block 200) an error message from the target database 32 with respect to one transaction from the batch applied to the database 32, the agent 22 rolls back (at block 204) all transactions applied from the batch. For each transaction in the batch up to the failed transaction, the agent 22 may reapply (at block 206) the transaction to the database 34 and commit (at block 208) successfully reapplied transactions to the database 32. In one embodiment, after successfully reapplying one transaction, that transaction is committed, and the next transaction after the failed transaction is applied in response to successfully committing a previous transaction. Committing after each transaction unblocks dependent transactions. In an alternative embodiment, the agent 22 may commit the reapplied transactions in the batch to the database 32 in response to successfully completing all of the transactions up to the failed transaction. The agent 22 then returns (at block 210) complete to the browser 20 in response to successfully committing the transactions in the batch up to the failed transaction, wherein the complete indicates the transactions up to the failed transaction that were successfully committed.

At block 211, the agent 22 processes the failed transaction. The agent 22 then may take different actions depending on the type of transaction error. If (at block 212) the error is a transient error, then the agent 22 adds the transaction to the RETRYQ 30. If (at block 214) the error is a database (DBMS) error, then the agent 22 retries the failed transaction until the failed transaction is the oldest transaction managed by the browser 20, and at that point then stops the apply process 18 and all agents 22 executing in the apply process 18. If (at block 216) the error is unrecoverable, then the agent 22 stops the apply process 18 and all agents 22 executing in the apply process 18. For instance, for a database contention error, the retry may succeed if the lock resulting in the contention error is released. Alternatively, the apply process 18 may stop all processing if the retries for a transaction fail a user specified maximum number of times.

In a further embodiment, after reapplying the transactions up to the failed transaction, to process the failed transaction, the agent 22 may exchange the failed transaction with a transaction in the WORKQ 26, such as a transaction that is older in terms of source-commit-order or by accessing the transaction currently at the head of the WORKQ 26 to add to the head of the WORKQ 26. In a yet further embodiment, after reapplying all transactions in the batch up to the failed transaction, the agent 22 may stop the apply process 18 and all agent 22 transaction processing if the failure was not caused by playing the transaction out-of-order, which is determined by checking that every transaction that was older, in terms of the source-commit-order, has been processed. The agent 22 maintains information indicating which non-completed transaction is the oldest and uses this information to determine when to stop processing.

In the described embodiments, the same agent 22 that received the error reapplies the transactions up to the failed transaction. In an alternative embodiment, the agent may apply transactions up to the failed transaction as part of a new batch formed by the agent 22.

Figure 8:
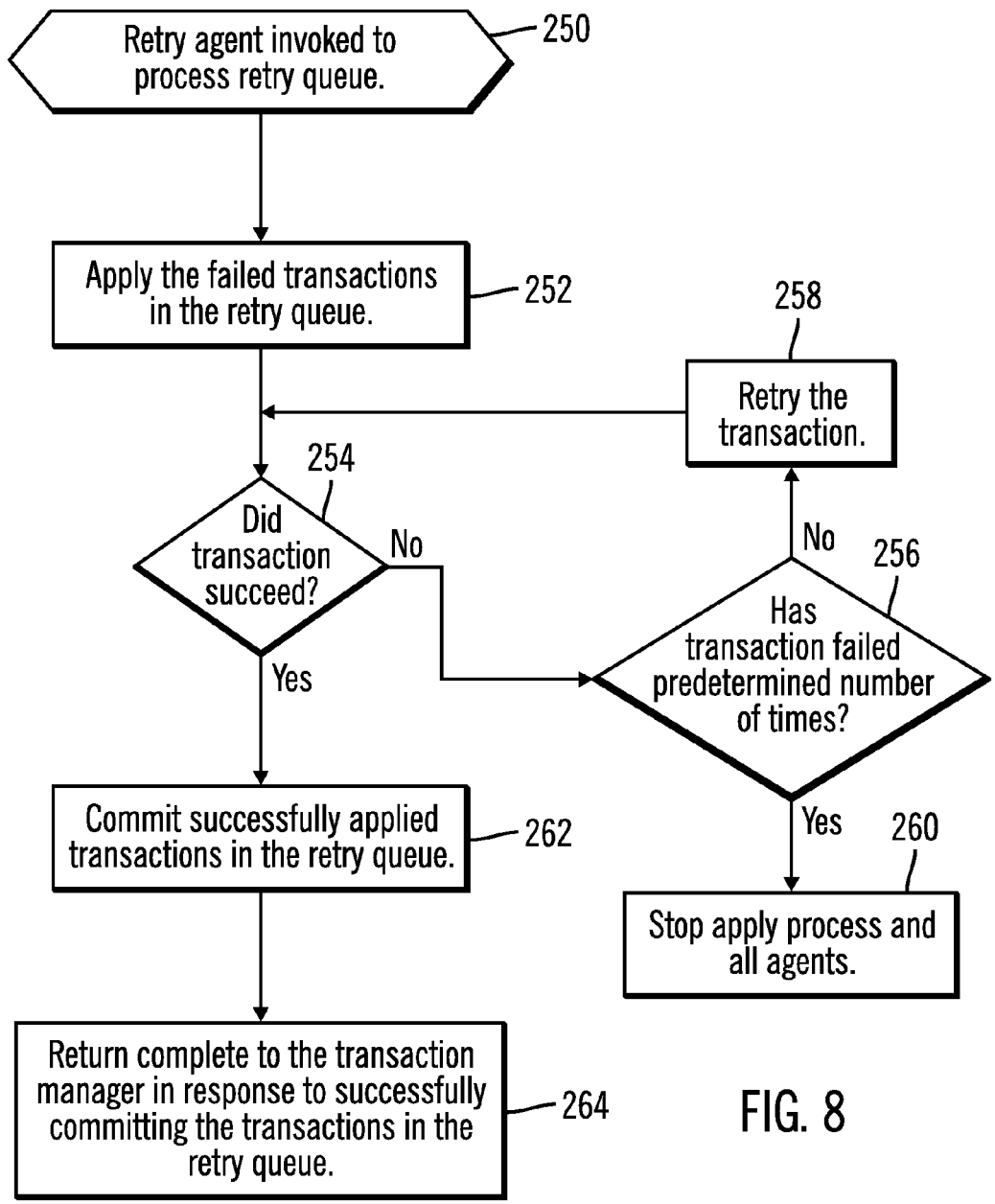
FIG. 8 illustrates an embodiment of operations to process failed transactions in a retry queue.

FIG. 8 illustrates an embodiment of operations performed by the retry agent 24 to process failed transactions in the retry queue 30. Upon being invoked (at block 250) to process the retry queue, the retry agent 24 applies (at block 252) the failed transactions in the retry queue 24. If (at block 254) the transaction failed, then the retry agent 24 determines (at block 256) whether the transaction has failed a predetermined number of times. If not, the retry agent 24 retries (at block 258) the transaction. If the retried transaction has failed the predetermined number of times, then the retry agent 24 stops (at block 260) the apply process 18 and all agents 22.

If (at block 254) the transaction succeeded, then the agent 22 commits (at block 262) the successfully applied transaction. The retry agent 24 returns (at block 264) complete to the transaction manager in response to successfully committing the transactions in the retry queue 30. The "complete" indicates that all the transactions were successfully committed. In one embodiment, the retry agent 24 may apply a next transaction in the retry queue 30 after committing a previously applied transaction in the retry queue 30. Alternatively, the retry agent 24 may wait to successfully complete all transactions in the retry queue 30, or all the transactions in a batch in the retry queue 30, before committing the transactions.

In certain embodiments, the plurality of agents 22 add failed transactions to the retry queue, and the retry agent 24 executes the failed transactions from the plurality of agents 22 in the retry queue 30. In a further embodiment, the agents 22 and retry agent 24 batch transactions and apply dependent transactions in a source-commit-order and non-dependent transactions in any order.

In one embodiment, a single retry agent 24 may process transactions in the RETRYQ 30, such that all previously failed transactions are applied serially to reduce the chance of more transient errors, and committing them as a batch of transactions if successful or committing them individually if transactions continue to fail, for example, due to external factors. In further embodiments, the retry agent 24 may switch to processing transactions on the WORKQ 26, if no transactions are available for processing on the RETRYQ 30, by checking the size of the RETRYQ 30. In a further embodiment, the retry agent 24 is not terminated when the number of available agents in the pool of agent threads is reduced by 1. Still further, when the number of agents to apply (NUM_APPLY_AGENTS) is set to one, the single agent is optimized to become the retry agent and any failed transactions with transient errors are automatically retried until the predefined maximum is exceeded, without placing the failed transaction on the RETRYQ 30.

With the described embodiments, the apply process 18 is improved by parallel executing agents applying transactions in batches and committing to the target database only once per batch. The apply process 18 handles database detected errors, such as contention errors, non-recoverable errors and dependency errors resulting from out-of-order executions for an individual transaction in a batch, without impacting transactions that are not in the batch and with minimal impact on the other transactions in this batch. In the described embodiments, the browser 20 preserves the priority of successful transactions in the batch and maintains overall transactional and database integrity.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing, or one or more devices or apparatuses, or interconnected devices or apparatuses. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
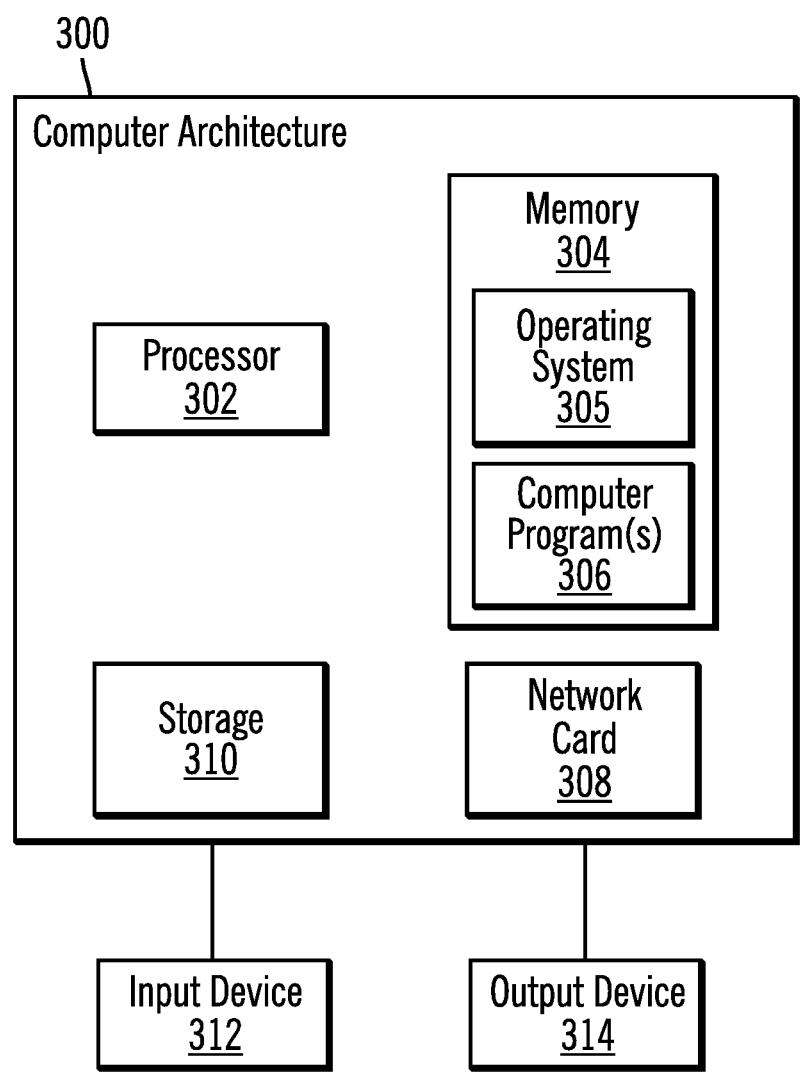
FIG. 9 illustrates an embodiment of a computer architecture.

FIG. 9 illustrates an architecture 500 of a computer system that may be used in accordance with certain embodiments. For instance, the source 2 and target 6 nodes and components therein may be implemented with the computer architecture 300. The computer architecture 300 may implement a processor 302 (e.g., a microprocessor), a memory 304 (e.g., a volatile memory device), and storage 310 (e.g., a non-volatile storage area, such as magnetic disk drives, flash drives, solid state storage drives (SSD), optical disk drives, a tape drive, etc.). An operating system 305 may execute in memory 304. The storage 310 may comprise an internal storage device or an attached or network accessible storage. Computer programs 306 in storage 310 may be loaded into the memory 304 and executed by the processor 302 in a manner known in the art. The architecture further includes a network card 308 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information from the processor 302, or other component, such as a display monitor, printer, storage, etc. The computer architecture 300 of the computer systems may include fewer components than illustrated, additional components not illustrated herein, or some combination of the components illustrated and additional components. The computer architecture 300 may comprise any computing device known in the art, such as a mainframe, server, personal computer, workstation, laptop, handheld computer, telephony device, network appliance, virtualization device, storage controller, etc. Any processor 302 and operating system 3 known in the art may be used.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product comprising a non-transitory computer readable storage medium having computer readable program code embodied therein that executes to process transactions directed to a database within a computer system by performing operations, the operations comprising:

receiving, by a transaction manager, a plurality of transactions to apply to the database;

adding, by the transaction manager, the transactions to a work queue;

processing, by one of a plurality of agents, a batch of transactions from the work queue, wherein each of the agents executes a batch of transactions from the work queue against the database independent of the operations of other of the agents executing batches of the transactions;

applying, by the agent, the transactions in the batch against the database;

committing, by the agent, the transactions in the batch to the database in response to completing all of the transactions;

receiving, by the agent, an error message from the database with respect to one of the transactions applied to the database comprising a failed transaction;

adding, by the agent, the failed transaction to a retry queue; and applying, by a retry agent, the failed transactions added to the retry queue to the database.

2. The computer program product of claim 1, wherein the transactions in the batch are committed in response to completing all the transactions without receiving an error message with respect to at least one of the transactions, wherein the operations further comprise:

returning, by the agent, complete to the transaction manager indicating successfully committing all the transactions in the batch.

3. The computer program product of claim 1, wherein the database comprises a source database, wherein the received transactions comprise transactions committed at the source database, and wherein the agents concurrently apply the transactions to a target database to provide asynchronous parallel data replication.

4. The computer program product of claim 1, wherein the applying, by the retry agent, of the failed transactions in the retry queue comprises:
applying each transaction in the retry queue to the database;
committing the applied transactions in the retry queue to the database in response to completing all of the transactions in the retry queue; and
returning complete to the transaction manager in response to successfully committing the transactions in the retry queue.

5. The computer program product of claim 1, wherein the applying, by the retry agent, of the failed transactions in the retry queue comprises:
for each transaction in the retry queue, applying the transaction to the database and committing the transaction after applying the transaction, wherein a next of the transactions in the retry queue is applied in response to successfully committing a previous of the transactions; and
returning complete to the transaction manager in response to successfully committing the transactions in the retry queue.

6. The computer program product of claim 1, wherein the plurality of agents add failed transactions to the retry queue, wherein the retry agent executes the failed transactions from the plurality of agents in the retry queue, wherein the retry agent batches transactions to execute in the retry queue, and wherein the retry agent and agents apply batched dependent transactions in a source-commit-order and non-dependent transactions in any order.

7. The computer program product of claim 1, wherein the operations further comprise:
receiving, by the agent, an error message from the database with respect to one transaction applied to the database comprising a failed transaction; and
stopping the agents processing of transactions in response to receiving the error message.

8. The computer program product of claim 1, wherein the operations further comprise:
receiving, by the agent, an error message from the database with respect to one of the transactions applied to the database comprising a failed transaction; and
reapplying, by the agent, the failed transactions.

9. The computer program product of claim 1, wherein the transactions in the batch are ordered, wherein the operations further comprise:
receiving, by the agent, an error message from the database with respect to one of the transactions applied to the database;
rolling back all the transactions applied from the batch; and
in response to rolling back all the transactions applied from the batch, stopping all agent processing of the transactions.

10. A computer program product comprising a non-transitory computer readable storage medium having computer readable program code embodied therein that executes to process transactions directed to a database within a computer system by performing operations, the operations comprising:
receiving, by a transaction manager, a plurality of transactions to apply to the database;
adding, by the transaction manager, the transactions to a work queue;
processing, by one of a plurality of agents, a batch of the transactions from the work queue, wherein each of the agents executes a batch of the transactions from the work queue against the database independent of the operations of other of the agents executing batches of the transactions;
applying, by the agent, the transactions in the batch against the database;
committing, by the agent, the transactions in the batch to the database in response to completing all of the transactions;
receiving, by the agent, an error message from the database with respect to one transaction applied to the database comprising a failed transaction;
retrying the failed transaction until the failed transaction is determined to be an oldest pending transaction; and
stopping the agents processing of transactions in response to determining that the failed transaction comprises the oldest pending transaction.

11. A computer program product comprising a non-transitory computer readable storage medium having computer readable program code embodied therein that executes to process transactions directed to a database within a computer system by performing operations, the operations comprising:
receiving, by a transaction manager, a plurality of transactions to apply to the database;
adding, by the transaction manager, the transactions to a work queue;
processing, by one of a plurality of agents, a batch of the transactions from the work queue, wherein each of the agents executes a batch of the transactions from the work queue against the database independent of the operations of other of the agents executing batches of the transactions, wherein the transactions in the batch are ordered;
applying, by the agent, the transactions in the batch against the database;
committing, by the agent, the transactions in the batch to the database in response to completing all of the transactions;
receiving, by the agent, an error message from the database with respect to one transaction applied to the database indicating that the transaction is a failed transaction;
rolling back all the transactions applied from the batch;
in response to rolling back all the transactions applied from the batch, for each of the transactions in the batch up to the failed transaction, reapplying the transaction to the database;
committing, by the agent, the reapplied transactions in the batch to the database in response to completing all of the transactions up to the failed transaction; and
returning, by the agent, complete to the transaction manager in response to successfully committing the transactions in the batch up to the failed transaction, wherein the complete indicates the transactions up to the failed transaction that were successfully committed.

12. A computer program product comprising a non-transitory computer readable storage medium having computer readable program code embodied therein that executes to process transactions directed to a database within a computer system by performing operations, the operations comprising:

receiving, by a transaction manager, a plurality of transactions to apply to the database;

adding, by the transaction manager, the transactions to a work queue;

processing, by one of a plurality of agents, a batch of the transactions from the work queue, wherein each of the agents executes a batch of the transactions from the work queue against the database independent of the operations of other of the agents executing batches of transactions, wherein the transactions in the batch are ordered;

applying, by the agent, the transactions in the batch against the database;

committing, by the agent, the transactions in the batch to the database in response to completing all of the transactions;

receiving, by the agent an error message from the database with respect to one of the transactions applied to the database indicating that the transaction is a failed transaction;

rolling back all the transactions applied from the batch;

in response to rolling back all the transactions applied from the batch, for each of the transactions in the batch up to the failed transaction, reapplying the transaction to the database and committing the transaction after reapplying the transaction, wherein a next of the transactions up to the failed transaction is applied in response to successfully committing a previous of the transactions; and returning, by the agent, complete to the transaction manager in response to successfully committing the transactions in the batch up to the failed transaction, wherein the complete indicates the transactions up to the failed transaction that were successfully committed.

13. A computer program product comprising a non-transitory computer readable storage medium having computer readable program code embodied therein that executes to process transactions directed to a database within a computer system by performing operations, the operations comprising:

receiving, by a transaction manager, a plurality of transactions to apply to the database;

adding, by the transaction manager, the transactions to a work queue;

processing, by one of a plurality of agents, a batch of the transactions from the work queue, wherein each of the agents executes a batch of the transactions from the work queue against the database independent of the operations of other of the agents executing batches of the transactions, wherein the transactions in the batch are ordered;

applying, by the agent, the transactions in the batch against the database;

committing, by the agent, the transactions in the batch to the database in response to completing all of the transactions;

receiving, by the agent, an error message from the database with respect to one of the transactions applied to the database indicating that the transaction is a failed transaction;

rolling back all the transactions applied from the batch;

in response to rolling back all the transactions applied from the batch, for each of the transactions in the batch up to the failed transaction, reapplying each of the transactions to the database; and exchanging the failed transaction with one of the transactions in the work queue.

14. A system, comprising:

a processor; and a computer readable storage medium including a work queue, a transaction manager, a plurality of agents, a database, a retry queue and a retry agent, wherein the transaction manager, the plurality of agents, and the retry agent are executed by the processor, to perform operations, the operations comprising:

receiving, by the transaction manager, a plurality of transactions to apply to the database;

adding, by the transaction manager, the transactions to the work queue;

processing, by one of the plurality of agents, a batch of the transactions from the work queue, wherein each of the agents executes a batch of the transactions from the work queue against the database independent of the operations of other of the agents executing batches of the transactions;

applying, by the agent, the transactions in the batch against the database;

committing, by the agent, the transactions in the batch to the database in response to completing all of the transactions;

receiving, by the agent, an error message from the database with respect to one of the transactions applied to the database comprising a failed transaction;

adding, by the agent, the failed transaction to the retry queue; and applying, by the retry agent, the failed transactions added to the retry queue to the database.

15. The system of claim 14, wherein the transactions in the batch are committed in response to completing all the transactions without receiving an error message with respect to at least one of the transactions, wherein the operations further comprise:

returning, by the agent, complete to the transaction manager indicating successfully committing all the transactions in the batch.

16. The system of claim 14, wherein the database comprises a source database, wherein the received transactions comprise transactions committed at the source database, and wherein the agents concurrently apply the transactions to a target database to provide asynchronous parallel data replication.

17. The system of claim 14, wherein the applying, by the retry agent, of the failed transactions in the retry queue comprises:

for each of the transactions in the retry queue, applying the transaction to the database and committing the transaction after applying the transaction, wherein a next of the transactions in the retry queue is applied in response to successfully committing a previous of the transactions; and returning complete to the transaction manager in response to successfully committing the transactions in the retry queue.

18. The system of claim 14, wherein the plurality of agents add failed transactions to the retry queue, wherein the retry agent executes the failed transactions from the plurality of agents in the retry queue, wherein the retry agent batches transactions to execute in the retry queue, and wherein the retry agent and agents apply batched dependent transactions in a source-commit-order and non-dependent transactions in any order.

19. A system, comprising:
a processor; and
a computer readable storage medium including a work queue, a database, a transaction manager, and a plurality of agents, wherein the transaction manager and the plurality of agents are executed by the processor to perform operations, the operations comprising:
  receiving, by the transaction manager, a plurality of transactions to apply to the database;
  adding, by the transaction manager, the transactions to the work queue;
  processing, by one of the plurality of agents, a batch of the transactions from the work queue, wherein each of the agents executes a batch of the transactions from the work queue against the database independent of the operations of other of the agents executing batches of transactions, wherein the transactions in the batch are ordered;
  applying, by the agent, the transactions in the batch against the database;
  committing, by the agent, the transactions in the batch to the database in response to completing all of the transactions;
  receiving, by the agent, an error message from the database with respect to one transaction applied to the database indicating that the transaction is a failed transaction;
  rolling back all the transactions applied from the batch;
  in response to rolling back all the transactions applied from the batch, for each of the transactions in the batch up to the failed transaction, reapplying the transaction to the database;
  committing, by the agent, the reapplied transactions in the batch to the database in response to completing all of the transactions up to the failed transaction; and
  returning, by the agent, complete to the transaction manager in response to successfully committing the transactions in the batch up to the failed transaction, wherein the complete indicates the transactions up to the failed transaction that were successfully committed.

20. A system, comprising:
a processor; and
a computer readable storage medium including a work queue, a database, a transaction manager, and a plurality of agents, wherein the transaction manager and the plurality of agents are executed by the processor to perform operations, the operations comprising:
  receiving, by the transaction manager, a plurality of transactions to apply to the database;
  adding, by the transaction manager, the transactions to the work queue;
  processing, by one of the plurality of agents, a batch of the transactions from the work queue, wherein each of the agents executes a batch of the transactions from the work queue against the database independent of the operations of other of the agents executing batches of the transactions, wherein the transactions in the batch are ordered;
  applying, by the agent, the transactions in the batch against the database;
  committing, by the agent, the transactions in the batch to the database in response to completing all of the transactions;
  receiving, by the agent an error message from the database with respect to one of the transactions applied to the database indicating that the transaction is a failed transaction;
  rolling back all transactions applied from the batch;
  in response to rolling back all the transactions applied from the batch, for each of the transactions in the batch up to the failed transaction, reapplying the transaction to the database and committing the transaction after reapplying the transaction, wherein a next of the transactions up to the failed transaction is applied in response to successfully committing a previous of the transactions; and
  returning, by the agent, complete to the transaction manager in response to successfully committing the transactions in the batch up to the failed transaction, wherein the complete indicates the transactions up to the failed transaction that were successfully committed.

21. A computer implemented method, comprising:
  receiving, by a transaction manager, a plurality of transactions to apply to a database;
  adding, by the transaction manager, the transactions to a work queue;
  processing, by one of a plurality of agents, a batch of the transactions from the work queue, wherein each of the agents executes a batch of transactions from the work queue against the database independent of the operations of other of the agents executing batches of the transactions;
  applying, by the agent, the transactions in the batch against the database;
  committing, by the agent, the transactions in the batch to the database in response to completing all of the transactions;
  receiving, by the agent, an error message from the database with respect to one of the transactions applied to the database comprising a failed transaction;
  adding, by the agent, the failed transaction to a retry queue; and
  applying, by a retry agent, the failed transactions added to the retry queue to the database.

22. The method of claim 21, wherein the transactions in the batch are committed in response to completing all the transactions without receiving an error message with respect to at least one of the transactions, further comprising:
  returning, by the agent, complete to the transaction manager indicating successfully committing all the transactions in the batch.

23. The method of claim 21, wherein the database comprises a source database, wherein the received transactions comprise transactions committed at the source database, and wherein the agents concurrently apply the transactions to a target database to provide asynchronous parallel data replication.

24. The method of claim 21, wherein the applying, by the retry agent, of the failed transactions in the retry queue comprises:
  for each of the transactions in the retry queue, applying the transaction to the database and committing the transaction after applying the transaction, wherein a next of the transactions in the retry queue is applied in response to successfully committing a previous of the transactions; and
  returning complete to the transaction manager in response to successfully committing the transactions in the retry queue.

25. The method of claim 21, wherein the plurality of agents add failed transactions to the retry queue, and wherein the retry agent executes the failed transactions from the plurality of agents in the retry queue, wherein the retry agent batches the transactions to execute in the retry queue, and wherein the retry agent and agents apply batched dependent transactions in a source-commit-order and non-dependent transactions in any order.

26. A computer implemented method, comprising:

receiving, by a transaction manager, a plurality of transactions to apply to a database;

adding, by the transaction manager, the transactions to a work queue;

processing, by one of a plurality of agents, a batch of the transactions from the work queue, wherein each of the agents executes a batch of the transactions from the work queue against the database independent of the operations of other of the agents executing batches of the transactions, wherein the transactions in the batch are ordered;

applying, by the agent, the transactions in the batch against the database;

committing, by the agent, the transactions in the batch to the database in response to completing all of the transactions;

receiving, by the agent, an error message from the database with respect to one of the transactions applied to the database indicating that the transaction is a failed transaction;

rolling back all the transactions applied from the batch;

in response to rolling back all the transactions applied from the batch, for each transaction in the batch up to the failed transaction, reapplying the transaction to the database;

committing, by the agent, the reapplied transactions in the batch to the database in response to completing all of the transactions up to the failed transaction; and returning, by the agent, complete to the transaction manager in response to successfully committing the transactions in the batch up to the failed transaction, wherein the complete indicates the transactions up to the failed transaction that were successfully committed.

27. A computer implemented method, comprising:

receiving, by a transaction manager, a plurality of transactions to apply to a database;

adding, by the transaction manager, the transactions to a work queue;

processing, by one of a plurality of agents, a batch of the transactions from the work queue, wherein each of the agents executes a batch of the transactions from the work queue against the database independent of the operations of other of the agents executing batches of the transactions, wherein the transactions in the batch are ordered;

applying, by the agent, the transactions in the batch against the database;

committing, by the agent, the transactions in the batch to the database in response to completing all of the transactions;

receiving, by the agent, an error message from the database with respect to one of the transactions applied to the database indicating that the transaction is a failed transaction;

rolling back all the transactions applied from the batch;

in response to rolling back all the transactions applied from the batch, for each of the transactions in the batch up to the failed transaction, reapplying the transaction to the database and committing the transaction after reapplying the transaction, wherein a next of the transactions up to the failed transaction is applied in response to successfully committing a previous of the transactions; and returning, by the agent, complete to the transaction manager in response to successfully committing the transactions in the batch up to the failed transaction, wherein the complete indicates the transactions up to the failed transaction that were successfully committed.

\* \* \* \* \*